(12) United States Patent
Wang et al.

(10) Patent No.: US 11,767,432 B2
(45) Date of Patent: Sep. 26, 2023

(54) METHOD FOR MECHANOCHEMICAL PREPARATION OF HIGH-PERFORMANCE IRON RED/CLAY MINERAL HYBRID PIGMENT

(71) Applicant: LANZHOU INSTITUTE OF CHEMICAL PHYSICS, CHINESE ACADEMY OF SCIENCES, Lanzhou (CN)

(72) Inventors: Aiqing Wang, Lanzhou (CN); Bin Mu, Lanzhou (CN); Wenbo Wang, Lanzhou (CN); Qin Wang, Lanzhou (CN); Yuru Kang, Lanzhou (CN); Aiping Hui, Lanzhou (CN)

(73) Assignee: LANZHOU INSTITUTE OF CHEMICAL PHYSICS, CHINESE ACADEMY OF SCIENCES, Gansu (CN)

( * ) Notice: Subject to any disclaimer, the term of this patent is extended or adjusted under 35 U.S.C. 154(b) by 289 days.

(21) Appl. No.: 17/269,767

(22) PCT Filed: Jul. 12, 2019

(86) PCT No.: PCT/CN2019/095803
§ 371 (c)(1),
(2) Date: Feb. 19, 2021

(87) PCT Pub. No.: WO2020/113958
PCT Pub. Date: Jun. 11, 2020

(65) Prior Publication Data
US 2021/0301142 A1    Sep. 30, 2021

(30) Foreign Application Priority Data
Dec. 6, 2018 (CN) .......................... 201811488068.3

(51) Int. Cl.
*C09C 1/24* (2006.01)
*C09C 3/00* (2006.01)
(Continued)

(52) U.S. Cl.
CPC ................ *C09C 1/24* (2013.01); *C09C 3/006* (2013.01); *C09C 3/041* (2013.01); *C09C 3/043* (2013.01);
(Continued)

(58) Field of Classification Search
CPC .............. C01P 2006/62; C01P 2006/63; C01P 2006/64; C01P 2006/65; C01P 2002/77;
(Continued)

(56) References Cited

U.S. PATENT DOCUMENTS

2010/0034730 A1* 2/2010 Lu ............................ C01G 9/02
977/773
2013/0309285 A1 11/2013 Matsufuji et al.

FOREIGN PATENT DOCUMENTS

CN      102583573 A     7/2012
CN      105694539 A     6/2016
(Continued)

*Primary Examiner* — Shuangyi Abu Ali
(74) *Attorney, Agent, or Firm* — Muncy, Geissler, Olds & Lowe, P.C.

(57) ABSTRACT

The disclosure relates to a method for mechanochemical preparation of an iron red pigment, which comprise steps: mixing a clay mineral, a soluble iron source and an alkali source in a mill for grinding to obtain a precursor, wherein the ratio of ball to material is controlled at 20-50, the grinding speed is 300-1200 rpm, and the grinding time is 30-360 min; and calcining the precursor at 500-900° C. for 30-120 min to obtain a high-performance iron oxide red/clay mineral hybrid pigment. The iron oxide red/clay mineral hybrid pigment has a bright and beautiful color, high-temperature and acid resistance, and can satisfy require- (Continued)

ments for high-performance iron oxide red pigments in fields of paints, inks, ceramics, anti-corrosive coatings, etc. Furthermore the method is a simple process without waste that is environmentally friendly and suitable for industrialized production, thus it is expected to replace existing processes of iron oxide red pigments.

5 Claims, 1 Drawing Sheet

(51) Int. Cl.
*C09C 3/04* (2006.01)
*C09C 3/06* (2006.01)
(52) U.S. Cl.
CPC ............ *C09C 3/06* (2013.01); *C01P 2006/62* (2013.01); *C01P 2006/63* (2013.01); *C01P 2006/64* (2013.01); *C01P 2006/65* (2013.01)
(58) Field of Classification Search
CPC .............. C01P 2004/03; C01P 2004/64; C01P 2006/37; C09C 1/24; C09C 3/006; C09C 3/041; C09C 3/043; C09C 3/06
See application file for complete search history.

(56) References Cited

FOREIGN PATENT DOCUMENTS

| CN | 105802282 A | * | 7/2016 | |
|---|---|---|---|---|
| CN | 108102433 A | * | 6/2018 | ............... C09C 1/24 |
| CN | 109370264 A | | 2/2019 | |

* cited by examiner

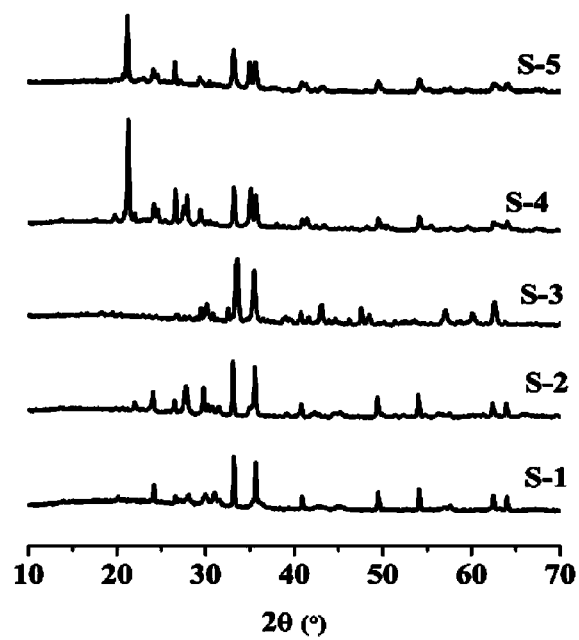

METHOD FOR MECHANOCHEMICAL PREPARATION OF HIGH-PERFORMANCE IRON RED/CLAY MINERAL HYBRID PIGMENT

CROSS REFERENCE TO RELATED APPLICATIONS

This application is the national phase entry of International Application No. PCT/CN2019/095803, filed on Jul. 12, 2019, the entire contents of which are incorporated herein by reference.

TECHNICAL FIELD

The present disclosure relates to a method for mechanochemical preparation of an iron red pigment, especially a method for mechanochemical preparation of a high-performance iron red/clay mineral hybrid pigment, which belongs to the technical field of nano inorganic pigment preparation.

BACKGROUND

Iron oxide red (referred to as iron red) is a very important inorganic color pigment with good pigment quality and is widely used in plastics, rubbers, coatings, floor tiles, ceramics and other fields. At present, there are two main methods for producing iron red: dry method and wet method, wherein the dry method mainly includes the green vitriol (i.e., ferrous sulfate heptahydrate) calcining method, the iron yellow calcining method, the iron black calcining method and the natural iron oxide mineral superfine grinding method using hematite as a raw material, etc. The wet process mainly includes the sulfate (i.e., ferrous sulfate or a solution containing ferrous sulfate) method, the nitrate (i.e., ferric nitrate, ferrous nitrate or a solution containing ferric nitrate) method, and the mixed acid method. In contrast, the dry process is the most traditional and original production process for iron red. Its production process is simple, time-saving and relatively small equipment investment, but the product quality is poor, and the harmful gases are generated during the calcination process. The product obtained by the wet process has excellent quality performance, but it is characterized by longer process, high energy consumption during the production process, and a large amount of acidic wastewater is produced. In addition, there is still a big gap in high-grade iron red varieties, such as miniaturization, high purity, heat resistance, and acid resistance. Therefore, there is an urgent need to develop a high-performance iron red pigment and green preparation process.

In recent years, the substrate-based inorganic hybrid pigments have attracted widespread attention from researchers, especially clay mineral-based inorganic hybrid pigments. The introduction of clay minerals for preparation of the iron red pigment not only improves its acid resistance and heat resistance, but also controls the particle size and size distribution of iron red particles (CN105694539A, CN105802282A). However, the relevant process involves hydrothermal reaction, and the preparation process is complicated, while the wastewater is generated. More importantly, the production cost is relatively high. As a substance is subjected to a mechanical force, the mechanical force not only promotes the change of the crystalline state, refinement and activation of the particles and crystal grains, and accelerates the reaction between materials to form new phases as well. Therefore, the use of mechanochemical synthesis of inorganic nanomaterials is expected to reduce the sintering temperature and increase the theoretical density. At the same time, it enables the various physical and chemical properties of the material to reach or approach the theoretical value of the material. Compared with the traditional solid phase method, the mechanochemical process is more environmentally friendly.

SUMMARY

For the defects of the existing preparation technology and the obtained product, the object of the present disclosure is to provide a method for preparing a high-performance iron red/clay mineral hybrid pigment. In addition, it also provides a feasible way to realize the high value, high quality and efficient utilization of clay minerals.

1. Preparation of a High-Performance Iron Red/Clay Mineral Hybrid Pigment

The mechanochemical preparation of high-performance iron red/clay mineral hybrid pigment is mainly comprised the following steps in the present disclosure: the mixture composed of clay mineral, soluble iron source and alkali source was added into a planetary ball mill for grinding to obtain a wet precursor. The ratio of ball to material is selected to 20-50, a grinding speed is 300-1200 rpm, and grinding time is 60-360 min during grinding process, and then the wet red precursor is calcined at 500-900° C. for 30-120 min to obtain a high-performance iron red/clay mineral hybrid pigment.

The clay mineral is one of natural or acid and heat treated one at least, which mainly includes attapulgite, montmorillonite, kaolinite, halloysite, sepiolite, serpentine, mica, vermiculite, rectorite, and vermiculite.

The soluble iron salt is one of ferric chloride, ferric sulfate, ferric nitrate, ferrous chloride, ferrous sulfate, ferrous acetate, and ferrous nitrate at least, and the addition amount of the soluble iron source is 0.5-4 times of the clay mineral mass.

The alkali source is one of sodium hydroxide, potassium hydroxide, sodium carbonate, sodium bicarbonate, sodium phosphate, and disodium phosphate at least, and the addition amount of the alkali source is 0.2-2.0 times of the soluble iron source mass.

2. Characterization of the High-Performance Iron Red/Clay Mineral Hybrid Pigment 1. X-Ray Diffraction Pattern of the Iron Red/Clay Mineral Hybrid Pigment The sole FIGURE is the X-ray diffraction pattern of the iron red/clay mineral hybrid pigment prepared by the present disclosure. The characteristic diffraction peaks of α-$Fe_2O_3$ are observed at 24.30°, 33.17°, 35.87°, 41.19°, 49.52°, 54.35°, 62.390 and 64.26°, and the characteristic diffraction peaks of the involved clay minerals basically disappear. It indicates that a solid solution is formed during the calcination process.

2. Weather Resistance of the Iron Red/Clay Mineral Hybrid Pigment

The CIE-L*a*b* color parameters of the iron red/clay mineral hybrid pigment prepared by the disclosure are shown in Table 1. The prepared iron red hybrid pigment exhibits higher L* and a* values, and its color saturation of C* is above 40, indicating that it presents the higher brightness and red value, and thus the color of hybrid pigment is bright.

3. Weather Resistance of the Iron Red/Clay Mineral Hybrid Pigment

In order to investigate the acid resistance of the hybrid pigment, the hybrid pigment is soaked into a 1 mol/L hydrochloric acid solution for 24 h, and the CIE-L*a*b* parameters of the hybrid pigment before and after being soaked are studied. As shown in Table 2, the CIE-L*a*b* parameters of the hybrid pigment almost did not change before and after soaking, indicating that the hybrid pigment exhibits excellent acid resistance.

In order to investigate the heat resistance of the prepared hybrid pigment, the prepared hybrid pigment is calcined at 900° C. for 2 h, and the changes of the CIE-L*a*b* color parameters before and after being calcined are observed. As shown in Table 3, no obvious changes are found for the CIE-L*a*b* color parameters of the hybrid pigment before and after being calcined, indicating that the hybrid pigment has excellent heat resistance. Therefore, it is expected to be used in paints, inks, ceramics, anti-corrosion coatings and other fields.

BRIEF DESCRIPTION OF DRAWINGS

The sole FIGURE is the X-ray diffraction patterns of the iron red/clay mineral hybrid pigment prepared by the present disclosure.

DETAILED DESCRIPTION

The preparation and performance of the high-performance iron red/clay mineral hybrid pigment of the present disclosure will be further illustrated by specific Examples below.

Example 1

0.25 g of attapulgite, 0.127 g of ferric chloride and 0.050 g of sodium hydroxide were mixed and put into a 45 mL zirconium dioxide ball mill. 17.31 g of 2 mm zirconium dioxide balls with a ball to material ratio of 20 was added and ground at 400 rpm for 120 min, and the obtained precursor was calcined at 700° C. for 60 min. The obtained iron red hybrid pigment was marked as S-1, and its color parameters of L*, a*, b* were shown in Table 1.

Example 2

0.3 g of montmorillonite, 0.600 g of iron sulfate and 0.246 g of sodium phosphate were mixed and put into a 45 mL zirconium dioxide ball mill. 36.15 g of 2 mm zirconium dioxide balls with a ball to material ratio of 25 was added and ground at 700 rpm for 60 min, and the obtained precursor was calcined at 600° C. for 90 min. The obtained iron red hybrid pigment was marked as S-2, and its color parameters of L*, a*, b* were shown in Table 1.

Example 3

0.4 g of sepiolite, 0.127 g of ferric chloride, 0.152 g of ferrous sulfate and 0.250 g of sodium carbonate were mixed and put into a 80 mL zirconium dioxide ball mill. 37.16 g of 2 mm zirconium dioxide balls with a ball to material ratio of 40 was added and ground at 400 rpm for 120 min, and the obtained precursor was calcined at 500° C. for 120 min. The obtained iron red hybrid pigment was marked as S-3, and its color parameters of L*, a*, b* were shown in Table 1.

Example 4

0.2 g of kaolinite, 0.242 g of ferric nitrate and 0.168 g of sodium carbonate were mixed and put into a 80 mL zirconium dioxide ball mill. 30.50 g of 2 mm zirconium dioxide balls with a ball to material ratio of 50 was added and ground at 400 rpm for 120 min, and the obtained precursor was calcined at 500° C. for 120 min. The obtained iron red hybrid pigment was marked as S-4, and its color parameters of L*, a*, b* were shown in Table 1.

Example 5

0.2 g of kaolinite, 0.2 g of halloysite, 0.36 g of ferrous acetate and 0.492 g of sodium carbonate were mixed and put into a 80 mL zirconium dioxide ball mill. 37.56 g of 2 mm zirconium dioxide balls with a ball to material ratio of 30 was added and ground at 800 rpm for 240 min, and the obtained precursor was calcined at 700° C. for 90 min. The obtained iron red hybrid pigment was marked as S-5, and its color parameters of L*, a*, b* were shown in Table 1.

TABLE 1

CIE-L*a*b* color parameters of the iron red/clay mineral hybrid pigment obtained in the Examples of the present disclosure

| Samples | L* | a* | b* | C* |
|---|---|---|---|---|
| S-1 | 36.11 | 31.38 | 29.89 | 43.33 |
| S-2 | 37.4 | 32.15 | 30.92 | 44.61 |
| S-3 | 36.82 | 31.45 | 30.62 | 43.89 |
| S-4 | 37.66 | 31.41 | 30.18 | 43.56 |
| S-5 | 38.4 | 32.27 | 31.76 | 45.28 |

TABLE 2

CIE-L*a*b* color parameters of the iron red/clay mineral hybrid pigment disclosureafter being immersed into 1 mol/L hydrochloric acid

| Samples | L* | a* | b* | C* |
|---|---|---|---|---|
| S-1 | 35.9 | 30.98 | 28.89 | 42.36 |
| S-2 | 36.65 | 31.48 | 30.76 | 45.00 |
| S-3 | 31.35 | 31.16 | 30.40 | 43.53 |
| S-4 | 37.40 | 31.35 | 30.41 | 43.68 |
| S-5 | 38.37 | 32.01 | 31.64 | 45.00 |

TABLE 3

CIE-L*a*b* color parameters of the iron red/clay mineral hybrid pigment after being calcined at 900° C. for 2 h

| Samples | L* | a* | b* | C* |
|---|---|---|---|---|
| S-1 | 33.89 | 30.18 | 28.19 | 41.30 |
| S-2 | 33.57 | 30.05 | 29.32 | 41.98 |
| S-3 | 35.44 | 29.91 | 30.48 | 42.80 |
| S-4 | 34.76 | 30.56 | 29.88 | 42.74 |
| S-5 | 36.64 | 31.48 | 31.06 | 44.22 |

What is claimed is:

1. A method for mechanochemical preparation of an iron red/clay mineral hybrid pigment, comprising the flowing steps: adding a mixture composed of clay minerals, soluble iron sources and alkali sources into a planetary ball mill for grinding to obtain a precursor, and then calcining the obtained precursor at a temperature to obtain the iron red/clay mineral hybrid pigment, wherein an amount of the soluble iron source is 0.5-4 times of the amount of the clay minerals, wherein an amount of the alkali source is 0.2-2.0 times of the amount of the soluble iron source, wherein an amount ratio of ball to the mixture is 20-50, a grinding speed is 300-1200 rpm, and a grinding time is 60-360 minutes during grinding, and wherein the calcination temperature of the precursor is 500-900° C., and a calcination time is 30-120 minutes.

2. The method for mechanochemical preparation of the iron red/clay mineral hybrid pigment according to claim 1, wherein the clay minerals are acids and heat treated natural clay minerals.

3. The method for mechanochemical preparation the iron red/clay mineral hybrid pigment according to claim 1, wherein the clay minerals are selected from the group consisting of attapulgite, montmorillonite, kaolinite, halloysite, sepiolite, serpentine, mica, vermiculite, and rectorite.

4. The method for mechanochemical preparation of the iron red/clay mineral hybrid pigment according to claim 1, wherein the soluble iron sources are at least one of ferric chloride, ferric sulfate, ferric nitrate, ferrous chloride, ferrous sulfate, ferrous acetate, and ferrous nitrate.

5. The method for mechanochemical preparation of iron red/clay mineral hybrid pigments according to claim 1, wherein the alkali sources are at least one of sodium hydroxide, potassium hydroxide, sodium carbonate, sodium bicarbonate, sodium phosphate, and disodium phosphate.

\* \* \* \* \*